Nov. 10, 1953     C. M. ANDERSEN     2,658,536
BLOSSOM STEMMING MACHINE

Filed Aug. 8, 1949     3 Sheets-Sheet 1

CHARLES M. ANDERSEN,
INVENTOR.

BY
ATTORNEY.

Nov. 10, 1953     C. M. ANDERSEN     2,658,536
BLOSSOM STEMMING MACHINE
Filed Aug. 8, 1949     3 Sheets-Sheet 2
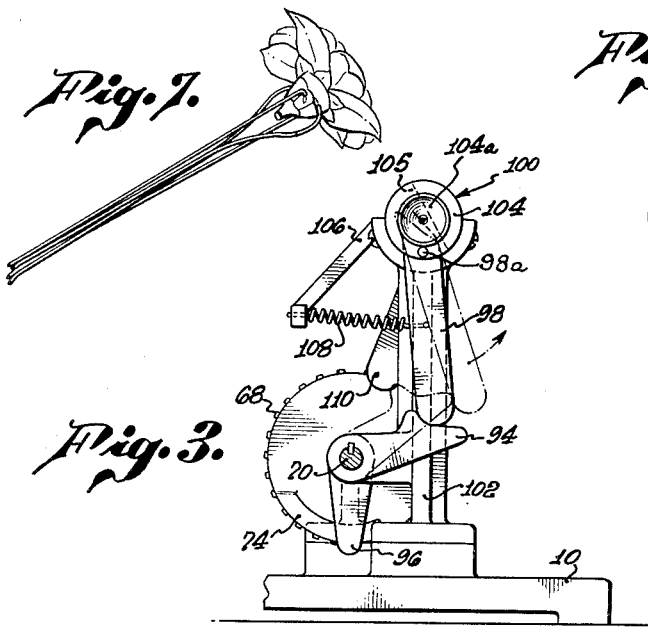
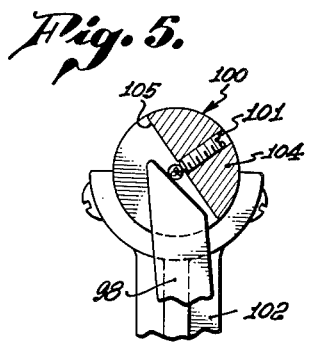
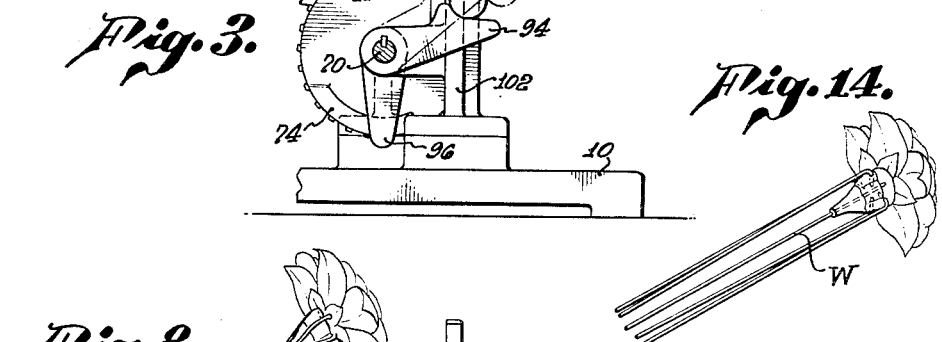
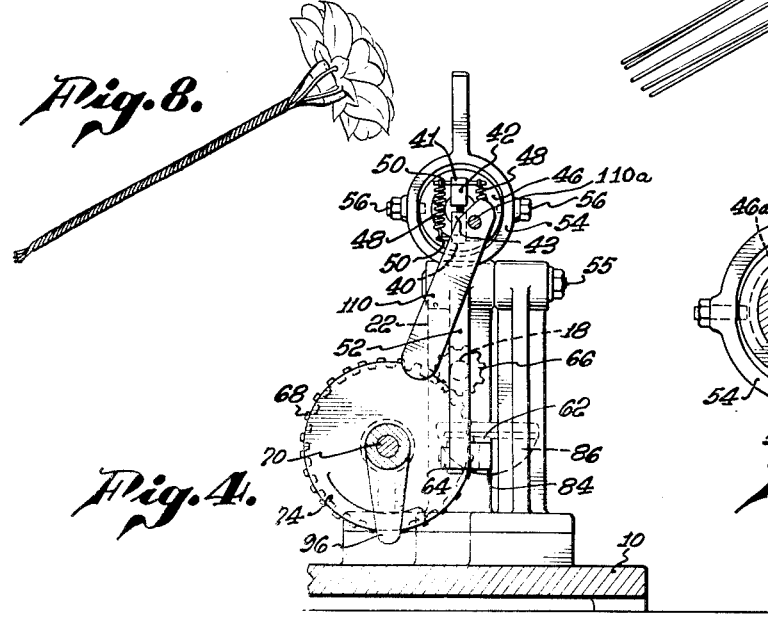
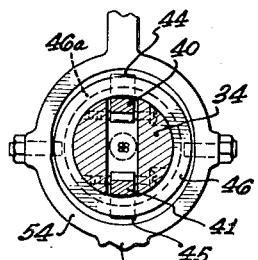
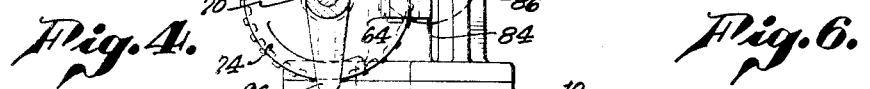
CHARLES M. ANDERSEN,
INVENTOR.
BY
ATTORNEY.

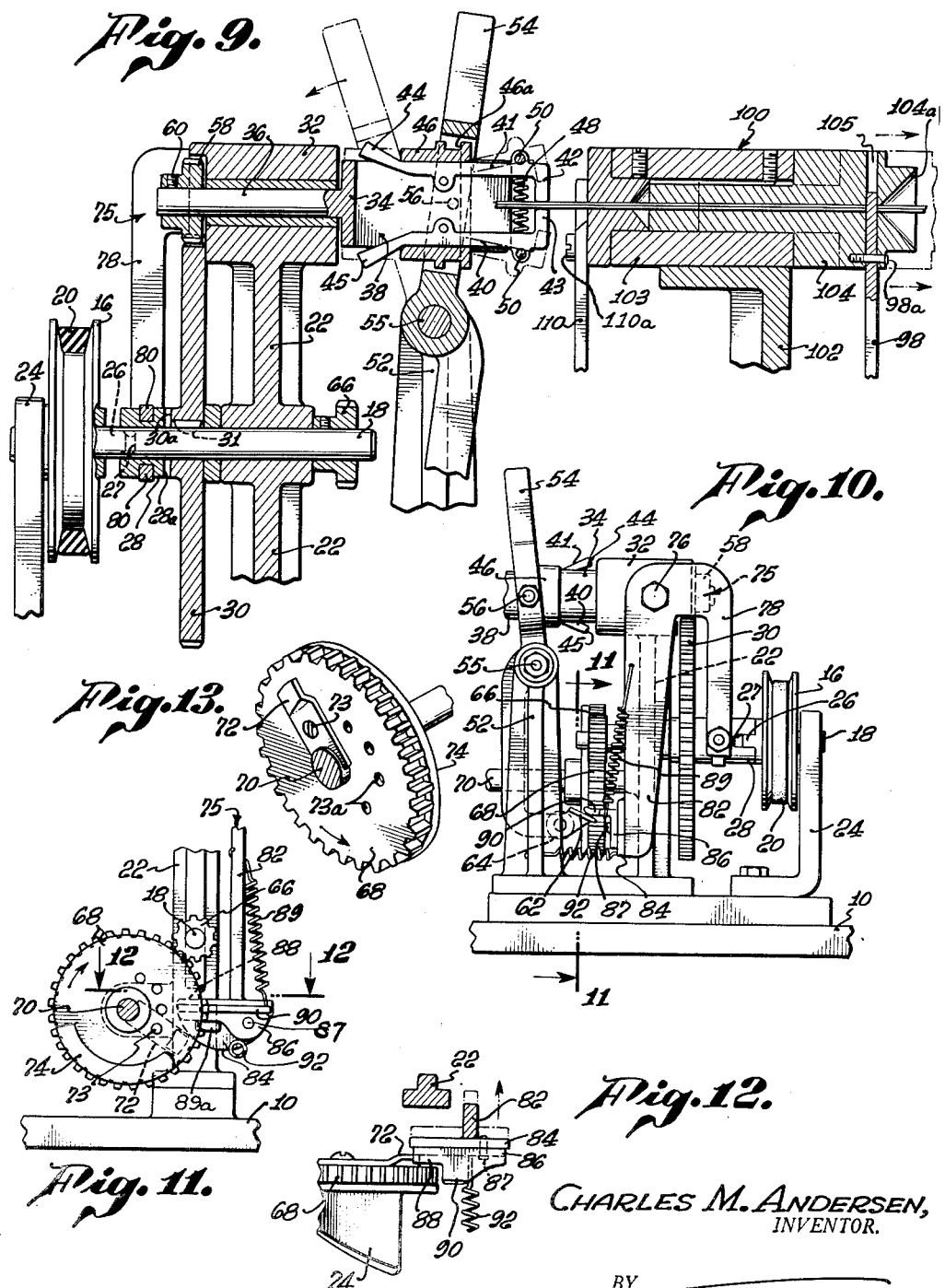

Patented Nov. 10, 1953

2,658,536

UNITED STATES PATENT OFFICE 2,658,536

BLOSSOM STEMMING MACHINE

Charles M. Andersen, Los Angeles, Calif., assignor to Floyd R. Honn, Los Angeles, Calif.

Application August 8, 1949, Serial No. 109,115

4 Claims. (Cl. 140—71)

My invention relates to machines for twisting wire and is specifically designed to twist wire stems on flowers having naturally brittle or weak stems making it difficult to use the flowers for such purposes as the decorating of parade floats or of trees or shrubbery for special occasions, for which purposes the flowers may be otherwise very well suited.

The invention will be described hereinafter as applied to camellias from which the natural stem is removed and an artificial wire stem substituted, but it is to be understood that the invention may be used to supply artificial stems or reinforced stems to flowers of various kinds.

Many very decorative flowers have a firmly formed and well defined calyx or base connected to the stem of the flower and from which the petals of the flower extend, but some flowers, while having petals which are fleshly and wax-like in appearance and will keep very well when cut, are difficult to arrange in vases or other displays because of the brittleness of the stem. In some other instances the flowers in nature droop from thin stems. For this reason the brittle camellia stems are often pinched off and the flowers floated in bowls, in which the flowers will retain their freshness for several days. When made up into corsages or used for decorative effects, the camellia stems are usually strengthened by wrapping the stems and leaves surrounding the flower with tin foil. It has previously been prohibitively expensive to use such flowers for large scale decoration because of the time and work required to properly support them.

A further feature of camellias and some other flowers is that the petals in the center are closely folded, and this portion of the cut flower usually is the first to weaken and tend to drop off, thus detracting from its appearance.

Flowers provided with the wire stems formed by my machine are very well adapted for use in large floral displays which always comprise a framework covered with wire netting into which the flowers are secured as well as for being mounted in shrubs and bushes to give an appearance of luxuriant blossoming.

It is an object of my invention to provide a simple and inexpensive machine by which florists wire may be quickly formed into stems substituted for the natural stem of flowers of the kind referred to and thus enable them to be used for many purposes for which they are well suited except for the nature of their natural stems.

A further object of the invention is to provide a fully automatic machine requiring only that the operator insert the wires, fastened in the calyx of the flower and bent into longitudinal relation, into the wire holding clamps of the machine and move an operating member whereupon the machine will rapidly twist the wires into a stem, cut off any excess wire and release the stem for removal by the operator.

Yet another object of my invention is to provide an automatic machine for forming a wire stem for camellias and other flowers having a central bud like portion, providing a support in the stem for the center bud like or closely folded portion.

Still another object of the invention is to provide a machine for making wire stems for flowers and fitted with means by which stems of different length may be made, such adjustment being very simply and quickly made.

It is also an object of my invention to provide a novel method of fitting flowers with wire stems.

Still further objects and features of my invention will hereinafter appear in the following specification taken in conjunction with the accompanying drawings illustrating an embodiment of the invention at present deemed preferable by me.

In the drawings:

Fig. 3 is a fragmentary end view of the machine looking from the right of Fig. 2;

Fig. 4 is a cross section on the line 4—4 of Fig. 2;

Fig. 5 is a fragmentary cross section on the line 5—5 of Fig. 2, but drawn on a larger scale;

Fig. 6 is a fragmentary cross section on the line 6—6 of Fig. 2 drawn on a larger scale;

Fig. 7 is a perspective view showing an initial step in the application of wire to a flower to replace a natural stem with a twisted wire stem produced by the use of my machine;

Fig. 8 is a perspective view showing a flower fitted with a twisted wire stem produced by the machine of my invention;

Fig. 9 is a fragmentary cross section on the line 9—9 of Fig. 1 but drawn on a larger scale;

Fig. 10 is a fragmentary view in side elevation of the machine looking in the direction of the arrow 10 shown in Fig. 1, and drawn on a larger scale;

Fig. 11 is a fragmentary cross section on the line 11—11 of Fig. 10;

Fig. 12 is a fragmentary cross section on the line 12—12 of Fig. 11;

Fig. 13 is a perspective view of a control gear shown in Fig. 2, to make clear the arrangement of an adjustable cam thereon, and drawn on a larger scale; and Fig. 14 is a perspective view showing a modification of the twisted wire stem which may also be produced by the machine of my invention.

Figures 1, 2:
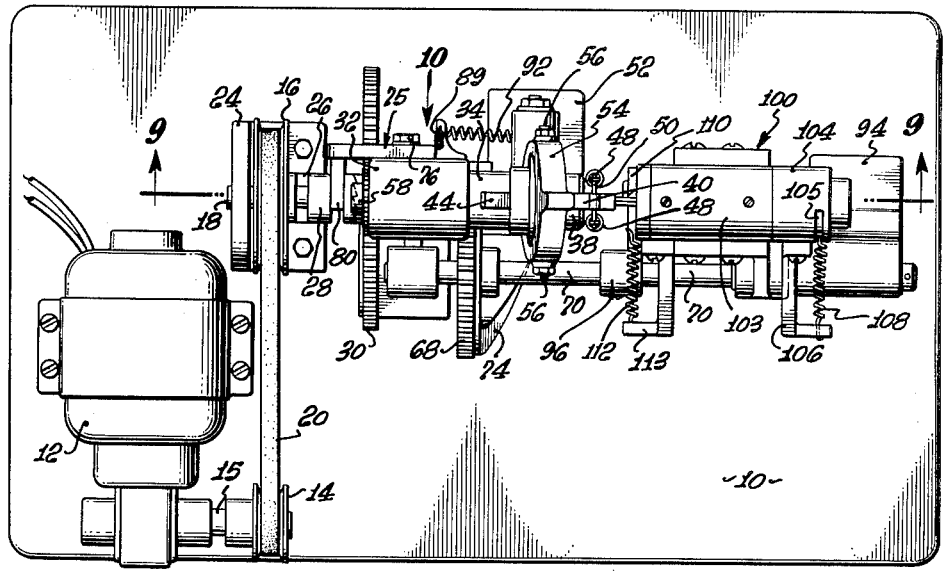
Fig. 1 is a plan view of the wire flower stem winding machine of my invention.
Fig. 2 is a side elevation of the machine shown in Fig. 1.

In the drawings the machine of my invention is shown as a self contained unit mounted on a base 10. A motor 12 is mounted on the base and a belt pulley 14 is secured on the shaft 15 extending from the conventional speed reduction gear built into the motor housing. A driven belt pulley 16 is mounted on a main driven shaft 18 but rotates freely thereon, pulley 16 being driven from pulley 14 by belt 20. Shaft 18 is mounted in bearings in a main back bearing member 22 and an outboard bearing 24. The center boss of pulley 16 is provided with a laterally extending tongue 26 engaging in a slot 27 in one end face of a drive clutch member 28 slidably mounted on shaft 18 and provided on its opposite end face with a saw toothed clutching surface 28a.

A driving gear 30 is secured on shaft 18 by a key 31 (Fig. 9) and the center hub of the gear is provided with a saw toothed side face 30a with which the saw toothed face 28a of the clutch member 28 may be engaged.

The main bearing member 22 is formed at its upper end with a journal bearing 32 for a rotatable wire twisting member 34 supported by a shaft 36 extending through the bearing 32 with an enlarged tubular head 38 in which are mounted a pair of single acting pivoted wire gripping members 40, 41, having inwardly projecting serrated wire engaging jaws 42, 43 at one end and outwardly sloped tails 44, 45 at their opposite ends. An operating sleeve 46 is mounted for sliding movement on the tubular head 38 and is provided with a peripheral groove 46a. The jaws of the members 40, 41 are strongly urged together by a pair of tension springs 48 hooked at each end to pins 50 extending through the jaws.

A standard 52 secured to base 10 serves to support a pivoted operating lever 54 by which the entire operation of the machine is controlled with the cooperation of automatically operating parts later described. There is also provided a switch (not shown) for the motor 12. Lever 54 in its upper part is ring shaped and embraces sleeve 46.

A pair of studs 56 screwed through the ring portion of lever 54 project into the peripheral groove 46a of sleeve 46 and are effective to slide the sleeve axially as lever 54 is manually swung about its pivot 55 in one direction to start each operation of the machine and automatically in the opposite direction to stop the machine, as later described.

The wire twisting member 34 is rotated by a pinion 58 secured, as by a set screw 60, to shaft 36 and meshes with driving gear 30 which is of much greater diameter and therefore member 34 is given a number of revolutions for each revolution of shaft 18.

The lower end of lever 54 is provided with a cam 62 (Fig. 10) and a roller 64 for the purpose of which will be later explained.

A lay shaft or cam shaft driving gear 66 (Fig. 9) is secured to the end of shaft 18 on the opposite side of main back bearing member 22 to that on which gear 30 is mounted, and meshes with a gear 68 secured to a lay or cam shaft 70 supported in bearings extending laterally from the main bearing members, the right hand bearing (as seen in Figs. 1 and 2) serving also to support clutch members holding the forward end of the wires as later described.

The gear 68 carries on one lateral face a cam 72 effective to release drive clutch 28 as later shown, and on its opposite face a cam 74 acting on roller 64 to rock lever 54 in a direction to slide sleeve 46 over the tails of the wire gripping members 40, 41 and release the stem. Since cam 72 controls the power drive clutch release and thus determines the duration of each operation of the machine it is adjustably mounted on gear 68 and is formed by bending the end of a metal strip which is secured by a stud 73 in one of a plurality of threaded holes 73a provided in gear 68. The end of the strip opposite the cam 72 is cut out to fit around shaft 70.

A U-shaped clutch operating lever 75 is pivoted at 76 to the journal bearing member 32 and straddles gear 30. One arm 78 of lever 75 is operatively connected to the clutch 28 by fingers 80 screwed into the lower end of the arm and projecting into a peripheral groove in the clutch 28. The lower end of the other arm 82 has brazed thereto a small plate 84 to which is pivoted a pawl 86 by a pin 87 secured in the plate. Pawl 86 has a flange 88 projecting into position to be engaged by drive clutch release cam 72 on gear 68, and is normally held in this position by a tension spring 89 which holds the pawl against stop 89a, Fig. 11, on plate 84. Pawl 88 also has a flange 90 on the same side of its pivot as flange 88 and projecting into position to be engaged by cam 62 on lever 54. When engaged by the cam 72 through pawl 86 the lever 75 will be rocked about its pivot to disengage clutch 28. A strong tension spring 92 tends to move lever 75 in a direction to engage the drive clutch 28 but cannot do so as long as cam 72 is engaged with flange 88 of pawl 86. When the machine is brought to rest by disengagement of clutch 28, flange 88 of pawl 86 remains engaged by cam 72.

When the operator moves lever 54 to the left (Fig. 10) cam 62 engages under flange 90 and tilts pawl 86 upwardly so that flange 88 of the pawl mounted on the tilted end clears cam 72, spring 92 is then free to rock lever 75 which engages drive clutch 28, and the machine is put into operation, the spring 89 however snapping pawl 86 into position to be again engaged by cam 72 as soon as cam 74 moves lever 54 automatically in the opposite direction, when drive clutch 28 will be again released.

The parts arranged at the front end of the machine will now be described. The lay shaft gear driven gear 68 is much larger than driving gear 66 so that the lay shaft rotates more slowly than shaft 18 and much slower than head 38.

Lay shaft 70 carries a cam 94 and a second cam 96. Cam 94 is positioned to engage a front wire holding lever 98 pivoted in an adjustable single acting wire holding member 100 carried by the main front bearing member 102.

The wire holding member 100 comprises a stationary tubular member 103 and an axially outwardly adjustable member 104 provided with a flared mouth 104a and provided with a slot 105 extending across an axial bore through members 103, 104, in which is received the upper end of wire holding lever 98 pivoted at 98a to member 104, Fig. 9. A set screw 101 (Fig. 5) is threaded into a hole drilled in member 104 and the end of the set screw aids in gripping the wires.

A bracket 106 is mounted on adjustable member 104 and a tension spring 108 is secured at one end to the bracket and at the other end to lever 98. Spring 108 is effective to tightly hold the end of the lever 98 against wires inserted through the axial bore while the machine is in operation but when the machine is at rest the lever end is held clear of the axial bore by the cam 94. It is to be noted that cam 94 is axially extended so that it will engage lever 98 regardless of adjustment of member 104.

A cut-off knife 110, Figs. 4 and 9, is pivoted at 110a to the rear end of the stationary member 103 and a tension spring 112 is secured at one end to a bracket 113 secured to the stationary member 103 and at the other end to the long arm of knife 110. Spring 112 is effective to hold the cutting edge of the knife away from the wire projecting through the rear of the member 100, but at the end of the operative cycle the long arm of knife 110 is engaged by cam 96 and rocked about its pivot so that the cutting edge of the knife, which as will be seen from Fig. 4 is formed adjacent its pivot, will shear through the wire.

The modified form of the twisted wire stem shown in Fig. 14 includes a central straight wire W which is thrust axially into the calyx of the flower but is twisted with the other wires as above described by my machine.

The operation of supplying blossoms with wire stems involves preferably nipping off the natural stem immediately below the calyx and pushing one or more lengths of the soft enameled wire produced for florists' use transversely through the base or calyx, of the petals leaving equal lengths projecting, bending them together against the sides of the calyx and to extend axially of the calyx, and then inserting them through member 100, the narrow extended bore of which will straighten or hold the wires straight and guide them between jaws 42, 43 in the rotatable clamping member 34. The machine, assuming the motor is running, is then put into operation by moving the lever 54 toward member 100 which immediately engages clutch 28, releases wire gripping members 40 and 41, so that jaws 42, 43 clamp the wires, and front clutch lever 98 to hold the wires. The wires are then twisted helically together until the reset cam 74 pushes lever 54 in the reverse direction, opening clutch members 40, 41 by sliding sleeve 46 over tails 44 thereof, and declutching the drive clutch as well as cutting the twisted wire stem to the length determined by the setting of member 104, and freeing the front clutch, enabling the completed stem to be withdrawn.

The operation of fitting a wire stem to a flower and forming it takes a few seconds only.

If the flower is of a kind in which it is advisable to provide a suport for a center closely folded portion, I utilize an additional straight wire thrust axially through the calyx and into the center portion of the flower, thus giving it a support which reduces the tendency of the bud like portion to be knocked off by an accidental touch.

It will be understood that by the term "wire" a filament of any material, metal or other, having the porperties of soft iron wire as to sufficient strength and formability is intended. Also that instead of wires pushed through the calyx and doubled on themselves, short wires may be employed having one end hooked into the calyx.

While I have particularly described and illustrated a form of the machine for carrying out my invention which has proved satisfactory in use, it is to be understood that various changes and modifications may be made in the described embodiment by those skilled in the art without departing from the scope of the invention as intended to be defined by the appended claims.

I claim:

1. A machine for forming wire stems on flowers comprising a driving shaft, a driven shaft, clutch means operatively connected to said driven shaft to releasably drivingly connect said shafts, a rotatable back clamp having members provided with jaws for holding and rotating the rear end of the wire stem, gearing arranged between said driven shaft and said rotatable back clamp operative to rotate said back clamp at a higher speed than the driven shaft, a manually operable lever for effecting the setting of said back clamp into operative position and having connected therewith means to engage said clutch, a front wire stem clamping member, a cam shaft rotated by said driving shaft, and cams rotated by said cam shaft and effective at the completion of each rotation to open the back and front clamping members and to operate the clutch to disconnect the driven shaft from driving connection with said driving shaft, a movable member having one end in operative engagement with the clutch; a plate pivoted vertically on the other end of the movable member; a spring urging said movable member in a direction effective to close the clutch; a first abutment on said plate arranged in the path of movement of one of the cams and effective when engaged by said cam to displace said movable member to open the clutch; and a second abutment on said plate arranged in the path of movement of the means for moving the rotatable back clamping means into operative position and when engaged by said latter means tilting the plate about its pivot to free the first abutment from the cam and thereby release the movable member to the action of the spring to close the clutch and set the machine in operation.

2. A machine as set forth in claim 1 and in addition comprising a second cam rotated by said cam shaft and effective toward the end of each revolution of the machine to return the means effecting the setting of the rotatable back clamp to initial position to release said back clamp from the wire stem.

3. In a machine for twisting together lengths of wire having spaced front and back wire clamping members, and means for effecting relative rotation of the clamping members: a front bearing member, a front wire clamping member mounted for axial adjustment in, and extending forwardly from, said front bearing member, the front wire clamping member having an unobstructed bore therethrough to enable wires to be passed from the forward end of and through said front wire clamping member; a twisted wire cut-off knife mounted at the rear of the front bearing means including a single manually operated element for putting the machine into operation and to close one of the clamping members upon the lengths of wire; means automatically closing the other clamping member upon the lengths of wire; means automatically operated to move the knife to cut a twisted length of wire immediately after the wire is twisted; means operating automatically immediately after the knife has cut the wire and effective to release said clamping members; and means automatically returning said manually operated element to initial position.

4. In a machine for twisting together lengths of wire having a pair of spaced front and back wire clamping members, power driven means for effecting relative rotation of the clamping members, a front bearing member, a front wire clamping member mounted for axial adjustment in said front bearing member, said front clamping member having a bore therethrough to enable wires to be passed through said front clamping member, means including a single manually operated element for putting the machine into operation and to close one of the clamping members upon the lengths of wire, means automatically closing the other clamping member upon the lengths of wire, means to release said clamping members, and means for automatically returning said manually operated element to initial position.

CHARLES M. ANDERSEN.

References Cited in the file of this patent

UNITED STATES PATENTS

| Number | Name | Date |
|---|---|---|
| 1,336,159 | Rice | Apr. 6, 1920 |
| 1,716,844 | Van Veen | June 11, 1929 |
| 1,753,793 | Lang | Apr. 8, 1930 |
| 1,911,835 | Lipps | May 30, 1933 |
| 2,022,043 | Knuvtila | Nov. 26, 1935 |
| 2,092,464 | Mathews | Sept. 7, 1937 |
| 2,130,209 | Von Brun | Sept. 13, 1938 |
| 2,217,301 | Wennberg | Oct. 8, 1940 |
| 2,234,641 | Baumgartner | Mar. 11, 1941 |
| 2,358,443 | Cave | Sept. 19, 1944 |
| 2,438,187 | Reynolds | Mar. 23, 1948 |
| 2,442,661 | Openshaw | June 1, 1948 |
| 2,542,686 | Febrre | Feb. 20, 1951 |